United States Patent
Baratz et al.

(10) Patent No.: US 10,681,121 B2
(45) Date of Patent: Jun. 9, 2020

(54) PROFILE INFORMATION BASED ON PARTICIPANT IDENTITY FOR PEER-TO-PEER SESSIONS

(75) Inventors: Alan Edward Baratz, Los Altos Hills, CA (US); John F. Buford, Princeton, NJ (US); Anthony Frank Bartolo, Saratoga, CA (US); Jayesh Govindarajan, Sunnyvale, CA (US); Anwar A. Siddiqui, Emeryville, CA (US); Vyankatesh Balaji Deshpande, Pune (IN)

(73) Assignee: Avaya, Inc., Basking Ridge, NJ (US)

( * ) Notice: Subject to any disclaimer, the term of this patent is extended or adjusted under 35 U.S.C. 154(b) by 1398 days.

(21) Appl. No.: 13/381,270

(22) PCT Filed: Oct. 20, 2010

(86) PCT No.: PCT/US2010/053290
§ 371 (c)(1),
(2), (4) Date: Dec. 28, 2011

(87) PCT Pub. No.: WO2011/050014
PCT Pub. Date: Apr. 28, 2011

(65) Prior Publication Data
US 2012/0110084 A1 May 3, 2012

Related U.S. Application Data

(60) Provisional application No. 61/253,303, filed on Oct. 20, 2009.

(51) Int. Cl.
*H04L 29/08* (2006.01)
*H04L 29/12* (2006.01)
(Continued)

(52) U.S. Cl.
CPC ...... *H04L 67/104* (2013.01); *H04L 29/12094* (2013.01); *H04L 61/1529* (2013.01);
(Continued)

(58) Field of Classification Search
CPC .................................................. H04L 65/1066
(Continued)

(56) References Cited

U.S. PATENT DOCUMENTS 6,175,859 B1  1/2001  Mohler
6,798,872 B1  9/2004  Matsumoto et al.
(Continued)

FOREIGN PATENT DOCUMENTS

CN  1761960 A  4/2006
CN  101044735 A  9/2007
(Continued)

OTHER PUBLICATIONS

U.S. Appl. No. 60/871,423, filed Dec. 21, 2006.
(Continued)

*Primary Examiner* — Adnan M Mirza

(57) ABSTRACT

A method is employed in association with a communication session over a peer-to-peer network between a first node associated with a first session participant and a second node associated with a second session participant. In the method, identification information identifying the second session participant is received. Profile information descriptive of the second session participant is gathered using the identification information. The communication session is conducted using the profile information descriptive of the second session participant.

16 Claims, 10 Drawing Sheets

(51) Int. Cl.
*H04M 3/42* (2006.01)
*H04L 29/06* (2006.01)
*H04M 7/00* (2006.01)

(52) U.S. Cl.
CPC ........ *H04L 65/104* (2013.01); *H04L 65/1069* (2013.01); *H04L 65/1096* (2013.01); *H04M 3/42042* (2013.01); *H04L 29/12122* (2013.01); *H04L 61/1547* (2013.01); *H04L 67/306* (2013.01); *H04M 7/0063* (2013.01)

(58) Field of Classification Search
USPC .................................................. 709/203, 204
See application file for complete search history.

(56) References Cited

U.S. PATENT DOCUMENTS

| | | | |
|---|---|---|---|
| 8,725,895 B2* | 5/2014 | Chaturvedi et al. | 709/238 |
| 2003/0086553 A1 | 5/2003 | Dezonno et al. | |
| 2003/0105812 A1 | 6/2003 | Flowers et al. | |
| 2004/0260761 A1 | 12/2004 | Leaute et al. | |
| 2005/0122965 A1 | 6/2005 | Heinla et al. | |
| 2005/0135335 A1 | 6/2005 | Hession et al. | |
| 2006/0052091 A1 | 3/2006 | Onyon et al. | |
| 2006/0064461 A1 | 3/2006 | Ludwig et al. | |
| 2006/0120377 A1 | 6/2006 | Caballero-McCann et al. | |
| 2006/0259765 A1 | 11/2006 | Song et al. | |
| 2006/0265508 A1 | 11/2006 | Angel et al. | |
| 2007/0047519 A1 | 3/2007 | Bangor et al. | |
| 2007/0047700 A1 | 3/2007 | Mohler | |
| 2007/0078930 A1 | 4/2007 | Ludwig et al. | |
| 2007/0110031 A1 | 5/2007 | Szeto | |
| 2007/0168426 A1 | 7/2007 | Ludwig et al. | |
| 2008/0008305 A1 | 1/2008 | Neuhaus | |
| 2008/0027924 A1 | 1/2008 | Hamilton et al. | |
| 2008/0075063 A1 | 3/2008 | Ha | |
| 2008/0123839 A1 | 5/2008 | McCormack et al. | |
| 2008/0163075 A1 | 7/2008 | Beck et al. | |
| 2008/0189366 A1 | 8/2008 | Cox et al. | |
| 2009/0136016 A1 | 5/2009 | Gornoi et al. | |
| 2010/0071053 A1 | 3/2010 | Ansari et al. | |
| 2010/0162173 A1 | 6/2010 | Schmitlin et al. | |
| 2010/0260326 A1 | 10/2010 | Michaelis et al. | |
| 2011/0075824 A1 | 3/2011 | Geppert et al. | |

FOREIGN PATENT DOCUMENTS

| | | |
|---|---|---|
| CN | 101494831 A | 7/2009 |
| DE | 102006039170 | 2/2008 |
| WO | 2008004207 | 1/2008 |
| WO | 2011126507 A1 | 10/2011 |

OTHER PUBLICATIONS

U.S. Appl. No. 60/870,359, filed Dec. 15, 2006.
U.S. Appl. No. 61/160,572, filed Mar. 16, 2009.
U.S. Appl. No. 61/163,559, filed Mar. 26, 2009.
C. Irish; "Web-enabled Call Centre;" BT Technology Journal; Apr. 2000; pp. 65-71; vol. 18; No. 2.
D. Bryan, et al.; "Concepts and Terminology for Peer to Peer SIP;" PSPSIP Working Group, Internet-Draft; Jul. 7, 2008; pp. 1-30; draft-ietf-p2psip-concepts-02.
E. Marocco, et al.; "Interworking between P2PSIP Overlays and Conventional SIP Networks;" Network Working Group, Internet-Draft; Mar. 2, 2007; pp. 1-25; draft-marocco-p2psip-interwork-01.
E. Shim, et al.; "An Architecture for Peer-to-Peer Session Initiation Protocol (P2P SIP);" SIPPING WG, Internet-Draft; Feb. 26, 2006; pp. 1-29; draft-shim-sipping-p2p-arch-00.
Timo Toivanen, et al.; "A Study on Interworking between Centralized SIP, P2P-SIP, and PSTN Networks;" May 5, 2006; 7 pages; Helsinki University of Technology; Finland.
Marocco et al. "Interworking between P2PSIP Overlays and Conventional SIP Networks." SIPeerior Technologies, Inc. Mar. 2, 2007.

* cited by examiner

PROFILE INFORMATION BASED ON PARTICIPANT IDENTITY FOR PEER-TO-PEER SESSIONS

TECHNICAL BACKGROUND

In the rapidly changing field of telecommunications, non-traditional phone products are increasing in popularity. Voice over Internet Protocol (VoIP) phone calling is one example that both enterprise class and residential class consumers enjoy in ever larger numbers due to its affordability and features. In addition to voice calling, VoIP products frequently provide chat and video calling capabilities.

While many VoIP products rely on centrally managed network architectures to function, VoIP can be delivered using peer-to-peer (P2P) technologies. A peer-to-peer network, aside from a limited number of root nodes, typically lacks the centralized elements and control of traditional, non-P2P networks. P2P networks can be considered overlay networks that operate at least a layer above an underlying communication network or collection of networks. Skype and P2P-SIP are just two examples of P2P VoIP products among many presently available that provide voice, chat, and video services using peer-to-peer technology.

Initially, the low quality of service of P2P VoIP products dissuaded customers from adopting these services. But over time, the quality of P2P VoIP products has increased sufficiently that they now enjoy widespread acceptance and use by residential and other non-enterprise class consumers. Unfortunately, present P2P VoIP products still have not attracted widespread acceptance by enterprise class consumers to a great extent because they lack many of the features required for enterprise class service.

OVERVIEW

Embodiments disclosed herein include systems, devices, methods, and software for providing an enhanced P2P VoIP experience whereby profile information associated with one session participant, such as, for example, a customer of a business entity, is employed to conduct or facilitate a communication session between the session participant and another session participant, such as, for example, a customer service agent of the business entity.

In an embodiment, a method is employed in association with a communication session over a peer-to-peer network between a first node associated with a first session participant and a second node associated with a second session participant. In the method, identification information identifying the second session participant is received. Profile information descriptive of the second session participant is gathered using the identification information. The communication session is then conducted or facilitated using the profile information descriptive of the second session participant.

In another embodiment, a communication device includes a communication interface, a processing system, and a data storage system. The device is operated in associated with a communication session over a peer-to-peer network between a first node associated with a first session and a second node associated with a second session participant. The communication interface is configured to receive identification information identifying the second session participant. The processing system is configured to gather profile information descriptive of the second session participant via the communication interface using the identification information. The data storage system is configured to store the profile information for subsequent transmission via the communication interface, wherein the profile information is to be employed to facilitate the communication session between the first node and the second node.

In yet another embodiment, a non-transitory computer readable storage medium has encoded thereon instructions executable by a processing system for employing a method in association with a communication session over a peer-to-peer network between a first node associated with a first session participant and a second node associated with a second session participant. In the method, identification information identifying the second session participant is received. Profile information descriptive of the second session participant is gathered using the identification information. The communication session is conducted or facilitated using the profile information descriptive of the second session participant.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
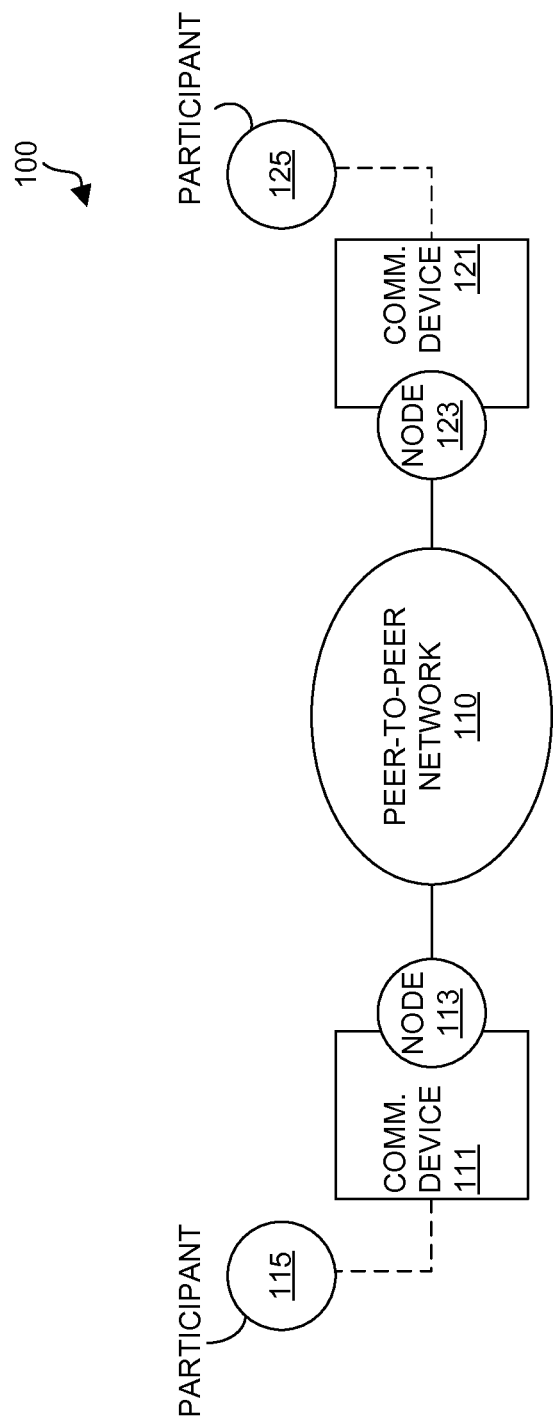
FIG. 1 illustrates a communication system in an exemplary embodiment.

FIG. 1 illustrates communication system 100 in an embodiment. Communication system 100 includes peer-to-peer (P2P) network 110, communication devices 111 and 121, and nodes 113 and 123. Communication devices 111 and 121 are operated by participants 115 and 125, respectively.

P2P network 110 comprises a network of nodes linked to network participants that together form a distributed network architecture. P2P network 110 can be considered an overlay network that operates at least a layer above an underlying communication network or collection of networks. For instance, P2P network 110 can overlay an internet network.

Referring to FIG. 1, communication devices 111 and 121, once registered as nodes with P2P network 110, include nodes 113 and 123, respectively. Nodes 113 and 123, respectively, may be software elements running on communication devices 111 and 121 that allow participants 115 and 125 to participate in P2P network 110. For example, nodes 113 and 123 may be communication software that provides chat, voice calling, or video calling capability, including variations or combinations thereof.

Communication devices 111 and 121 may comprise any type of device operable by participants 115 and 125 respectively in order to participate in communication sessions over P2P network 110. Examples of such communication devices include computers, phones, personal communication devices, or video phones, as well as any combination or variation thereof. In some implementations, either or both of communication devices 111 and 121 may be coupled with the P2P network 110 by way any intermediate device capable of interfacing between a separate communication network (not shown in FIG. 1) and P2P network 110 and registering as a node with P2P network 110. Gateways, private branch exchanges, switches, routers, and other network elements are examples of such an intermediate communication device.

Figure 2:
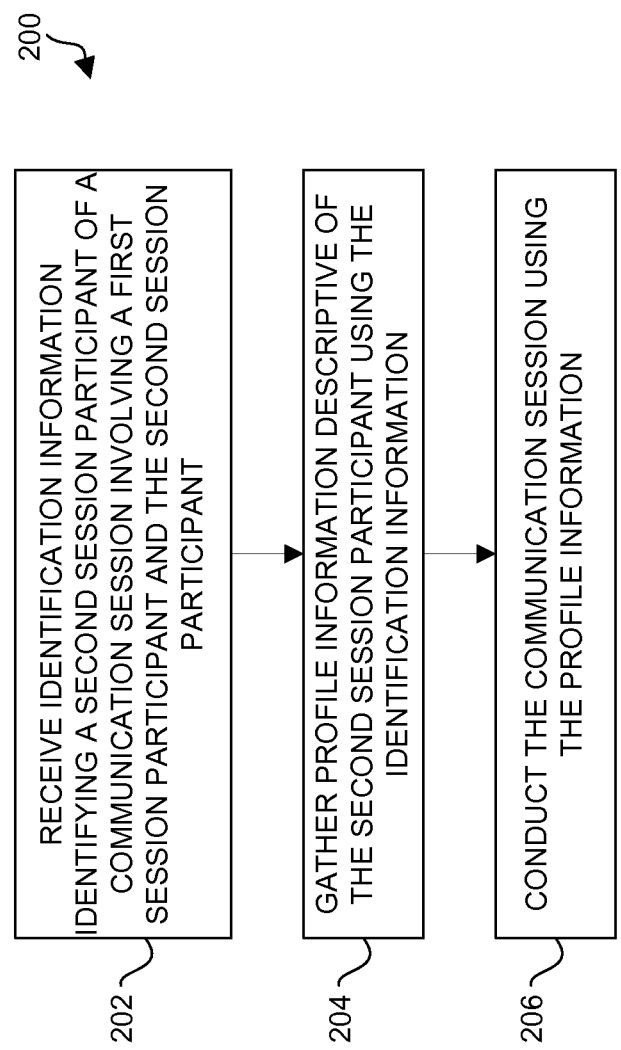
FIG. 2 illustrates a method of operating an electronic system in an exemplary embodiment.

FIG. 2 depicts a method 200 of employing the identity of one of at least a first session participant 115 and a second session participant 125 in a peer-to-peer communication session to conduct or facilitate the session. In one example, the first communication device 111 associated with the first session participant 115 registers as a first node 113 with the P2P network 110, and the second communication device 121 associated with the second session participant 121 registers as a node 123 with the network 110 in order to engage in a communication session over the network 110. Further, the communication session may be initiated by the first session participant 115, the second session participant 125, or a third party or related device.

In the method 200, identification information identifying one of the session participants (in this case, the second session participant 125) is received (operation 202). Such information may be, for example, a user or customer identifier employed by the second session participant 125 as an identifier for creation of communication sessions, such as phone conversations, chat sessions, video communications, and the like.

Profile information descriptive of the second session participant is gathered using the identification information (operation 204). Profile information may include any type of information associated with the second session participant 125, possibly including, but not limited to, personal information, demographic information, financial information, purchasing and other customer-related information, postings on business or social networking sites, and so on.

The communication session is then conducted or facilitated using the profile information (operation 206). Examples of facilitation of the communication session may include, but are not limited to, routing of information between the first communication device 111 and the second communication device 121, selection of the first communication device 111 to engage in the session, display or other presentation of the profile information to the first session participant 115 during the session, and the like.

Depending on the particular implementation, the various operations 202-206 of the method 200 may be performed by any one or more of the devices associated with, or included within, the communication system 100, such as the first communication device 111, the second communication device 121, one or more devices associated with other nodes of the P2P network 110, or some other device or system not directly related to the network 110. Also, one or more of the various operations depicted in FIG. 2 may occur before, during, or after the actual communication session. For example, using identification information from a previous communication session, profile information descriptive of the participant associated with the identification information may be gathered and stored for a subsequent communication session in which that participant engages.

Figure 3:
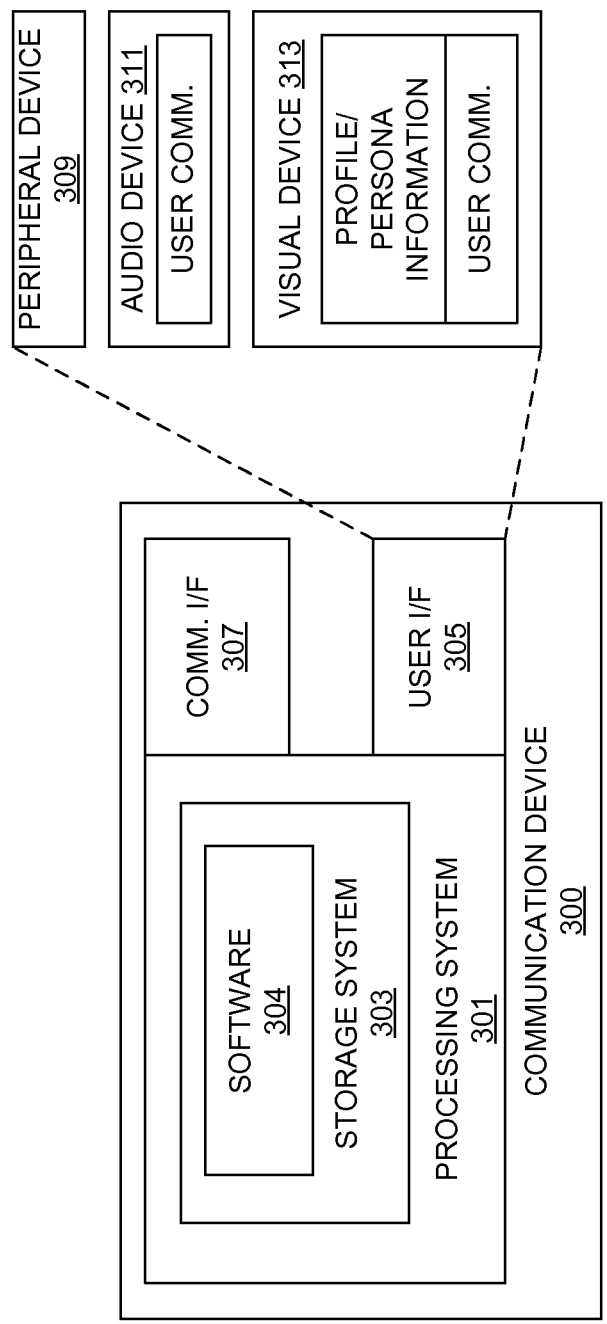
FIG. 3 illustrates a communication device in an exemplary embodiment.

FIG. 3 illustrates a communication device 300 in an embodiment. Communication device 300 may be representative of communication devices 111 and 121, although devices 111, 121 could use alternative configurations. Communication device 300 includes processing system 301, storage system 303, software 304, user interface 305, and communication interface 307. It should be understood that some elements could be omitted, such as user interface 305. Processing system 301 is linked to storage system 303, user interface 305, and communication interface 307. Storage system 303 stores software 304, executable in operation by processing system 301.

Communication interface 307 comprises a network card, network interface, port, or interface circuitry that allows communication device 300 to communicate with other communication devices over a variety of networks. Communication interface 307 may also include a memory device, software, processing circuitry, or some other device. Communication interface 307 may use various communication protocols, such as time division multiplex, internet, Ethernet, wireless, or some other communication format—including combinations thereof—to exchange communications as described herein for communication devices, such as user communications, profile information, and persona information. Examples of profile and persona information are described more fully below.

User interface 305 comprises components that interact with a user to receive user inputs and user communications and to present media and/or information. User interface 305 may include a speaker, microphone, buttons, lights, display screen, mouse, keyboard, or some other user input/output apparatus—including combinations thereof.

In this embodiment, user interface 305 includes peripheral device 309, audio device 311, and visual device 313. Peripheral device 309 could be any device that can receive or output user communications, such as a keyboard, mouse, or other such device. Likewise, audio device 311 is any device capable of receiving or outputting user communications, such as voice communications. Examples of audio device 311 include speakers, headphones, earphones, and microphones. Visual device 313 is any device capable of displaying images to a user, including persona information, profile information, and user communications. An example of a visual device 313 is a display screen.

Processing system 301 may comprise a microprocessor and other circuitry that retrieves and executes software 304 from storage system 303. Storage system 303 comprises a disk drive, flash drive, data storage circuitry, or some other memory apparatus. Processing system 301 is typically mounted on a circuit board that may also hold storage system 303 and portions of communication interface 307 and user interface 305.

Software 304 comprises computer programs, firmware, or some other form of machine-readable processing instructions. Software 304 may include an operating system, utilities, drivers, network interfaces, applications, virtual machines, or some other type of software. When executed by processing system 301, software 304 directs processing system 301 to operate communication device 300 to perform as described herein for communication devices, including communication devices 111 and 121.

Figure 4:
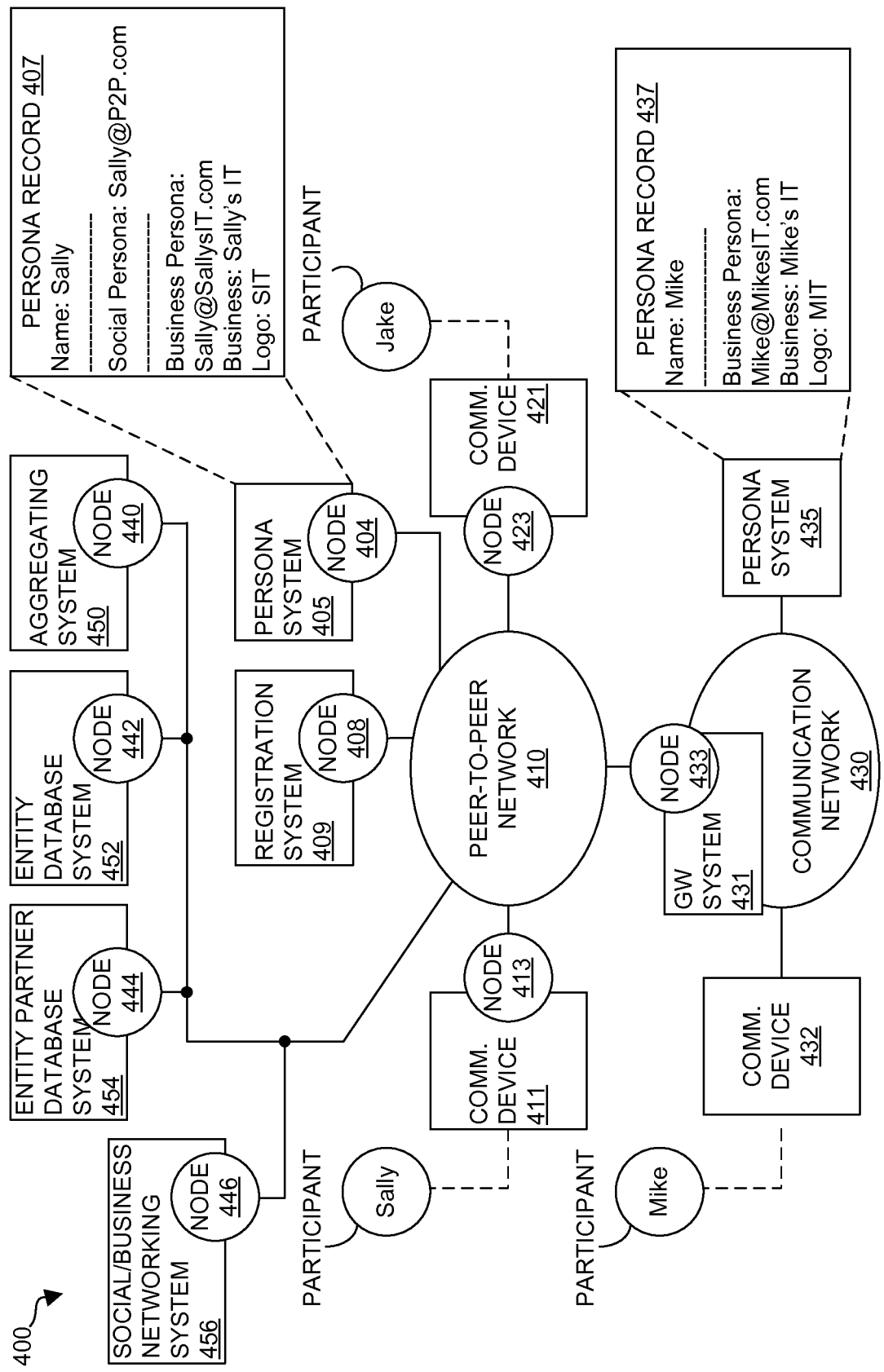
FIG. 4 illustrates a communication system in an exemplary embodiment.

FIG. 4 illustrates communication system 400 in an embodiment. Communication system 400 includes peer-to-peer (P2P) network 410, communication network 430, communication devices 411, 421, and 432, gateway system 431, nodes 404, 408, 413, 423, 433, 440, 442, 444, and 446, persona systems 405 and 435, registration system 409, aggregating system 450, entity database system 452, entity partner database system 454, and social/business networking system 456. In other implementation, some of these components may not be included, while others not illustrated in FIG. 4 may be incorporated therein.

In this illustrative embodiment, communication devices 411, 421, and 432 are operated by participants Sally, Jake, and Mike, respectively. Each participant may be associated with an entity, as can be seen from persona records 407 and 437. Persona record 407 includes information describing participant Sally, while persona record 437 contains information describing participant Mike. Persona record 407 is stored within persona system 405. Persona record 437 is stored within persona system 435.

Persona records 407 and 437 contain information about the entity associated with each participant. Thus, it should be understood that the entity may have control over many or all aspects of the persona information. In this manner, the recipient of the persona information will have confidence in the association of the other party with the entity. This may be accomplished by signing the persona information with the entity's digital certificate. It should be understood that other techniques are possible and are contemplated herein.

P2P network 410 comprises a network of nodes linked to network participants that together form a distributed network architecture. P2P network 410 can be considered an overlay network that operates at least a layer above an underlying communication network or collection of networks. For instance, P2P network 410 can overlay an internet network. The overlay network may utilize its own addressing scheme to further bind a participant to an entity, such as by using a handle that is linked to an entity. An example is whereby a user handle contains a domain with the name of an entity within it. The entity could be given ownership or control over a portion of the address space used by the overlay network so that only approved or authorized participants use handles that include the name of or a reference to the entity.

Referring to FIG. 4, communication devices 411, 421, and gateway system 431, once registered as nodes with P2P network 410, include nodes 413, 423, and 433 respectively. Registration system 409 may include node 408 and may be previously registered with P2P network 410. Likewise, persona system 405 may include node 404. It should be understood that node 404 is optional. For instance, persona system 405 could be reachable via alternate communications paths other than via node communication through P2P network 410.

Nodes 413, 423, and 433 may be software elements running on communication devices 411, 421, and 431 that allow participants to participate in P2P network 410. For example, nodes 413, 423, and 433 may be communication software that provides chat, voice calling, or video calling capability, including variations or combinations thereof. A Skype program application and a P2P-SIP program application are examples of communication software that could be employed on a communication device to provide P2P chat, voice, or video services.

Communication devices 411, 421, and 432 may comprise any type of device operable by participants in order to participate in communication sessions over P2P network 410. Communication device 300, illustrated in FIG. 3, is an example of communication device 411, 421, and 432. Examples of such communication devices include computers, phones, personal communication devices, or video phones, as well as any combinations or variations thereof. Gateway system 431 comprises any device capable of interfacing between communication network 430 and P2P network 410 and registering as node 433 with P2P network 410. Gateways, private branch exchanges, switches, routers, and other network elements are examples of gateway system 431.

As illustrated by persona record 407, participant Sally has two personas: a social persona and a business persona associated with an entity comprising a business, "Sally's IT." Generally, persona information is information that identifies or otherwise describes a particular person or entity. It should be assumed for illustrative purposes that Sally's IT is a business entity related to information technology. Sally's social persona includes a communication handle "sally@p2p.com" that may share characteristics with P2P network 410, such as a domain name.

Sally's business persona includes characteristics that distinguish her business persona from her social persona. For instance, Sally can be identified by a communication handle "sally@ sallysIT.com" that is unrelated to P2P network 410. Other aspects of her business persona include the name of her business, Sally's IT, as well as a logo for her business, SIT.

As illustrated by persona record 437, participant Mike has a single persona: a business persona related to his company, Mike's IT. It can be assumed for illustrative purposes that Mike's IT is a business entity also related to information technology. Mike's business persona includes characteristics that distinguish him when communicating over P2P network 410, such as a communication handle "mike@mikesIT.com." Other aspects of his business persona include the name of his business, Mike's IT, as well as a logo for his business, MIT.

While the entities mentioned above are business entities, an entity related to a persona could be a business or social group, association, or other such enterprise with which a communication session participant, such as Sally or Mike, may be linked. For instance, an entity may be a company owned or operated by a participant. Similarly, an entity may be a company that employs a communication session participant. It should be understood that a variety of other types of associative relationships between participants and entities is contemplated. It should also be understood that entities represented in a communication session could be distinct entities or the same entity.

As described further below, the persona of one participant may be transferred and displayed to another participant in a manner that distinguishes the one participant from general users on a peer-to-peer network. For example, a business persona for an initiating party can be displayed to a destination party, even though the destination party is reached via a peer-to-peer network. The display of the business persona may enhance the session experience of both the destination and initiating parties.

Also depicted in the communication system 400 of FIG. 4 are a number of systems that may aid in the generation and aggregation of profile information associated with a communication system participant, such as Jake in the particular example of FIG. 4. Such systems involved in the provision of profile information may include, but are not limited to, an aggregating system 450 associated with a node 440, an entity database system 452 associated with a node 442, an entity partner database system 454 associate with a node 444, and a social/business networking system 456 associated with a node 446. As a result, each of these systems 450, 452, 454, and 456 are represented by a respective node 440, 442, 444, and 446 registered with the P2P network 410. However, in other implementations, any one or more of these systems 450, 452, 454, and 456 may not be coupled with the P2P network 410, and may instead be accessible via other communication networks or connections. The functionality of these systems 450, 452, 454, and 456 as they relate to the gathering of profile information is described more fully below.

Figure 5:
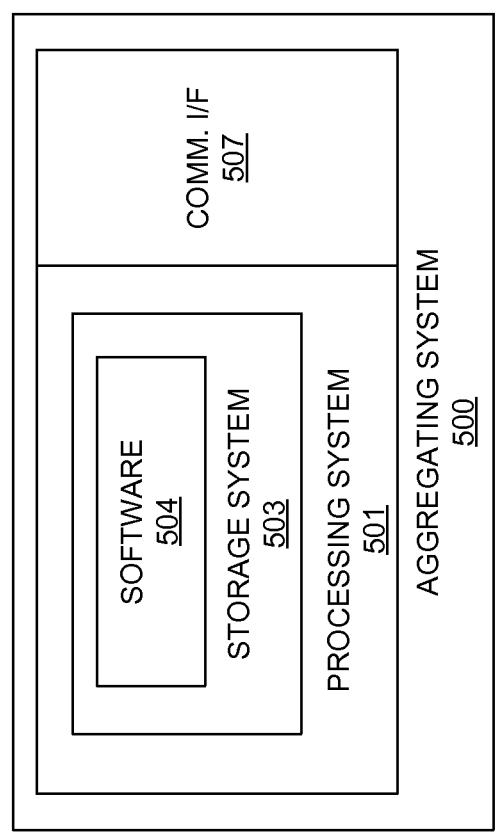
FIG. 5 illustrates a communication device in an exemplary embodiment.

FIG. 5 illustrates an example of an aggregating system 500, such as the aggregating system 450 illustrated in FIG. 4. In some embodiments, any or all of the entity database system 452, the entity partner database system 454, and the social/business networking system 456 may be similarly constructed. The aggregating system 500 includes processing system 501, storage system 503, software 504, and communication interface 507. Processing system 501 is linked to storage system 503 and communication interface 507. Storage system 503 stores software 504, executable in operation by processing system 501.

Communication interface 507 comprises a network card, network interface, port, or interface circuitry that allows aggregating system 500 to communicate with other communication devices over a variety of networks. Communication interface 507 may also include a memory device, software, processing circuitry, or some other device. Communication interface 507 may use various communication protocols, such as time division multiplex, internet, Ethernet, wireless, or some other communication format—including combinations thereof—to exchange communications as described herein for communication devices, such as profile information.

Processing system 501 may comprise a microprocessor and other circuitry that retrieves and executes software 504 from storage system 503. Storage system 503 comprises a disk drive, flash drive, data storage circuitry, or some other memory apparatus. Processing system 501 is typically mounted on a circuit board that may also hold storage system 503 and portions of communication interface 507.

Software 504 comprises computer programs, firmware, or some other form of machine-readable processing instructions. Software 504 may include an operating system, utilities, drivers, network interfaces, applications, virtual machines, or some other type of software. When executed by processing system 501, software 504 directs processing system 501 to operate aggregating system 500 as described herein for aggregating system 450.

Figure 6:
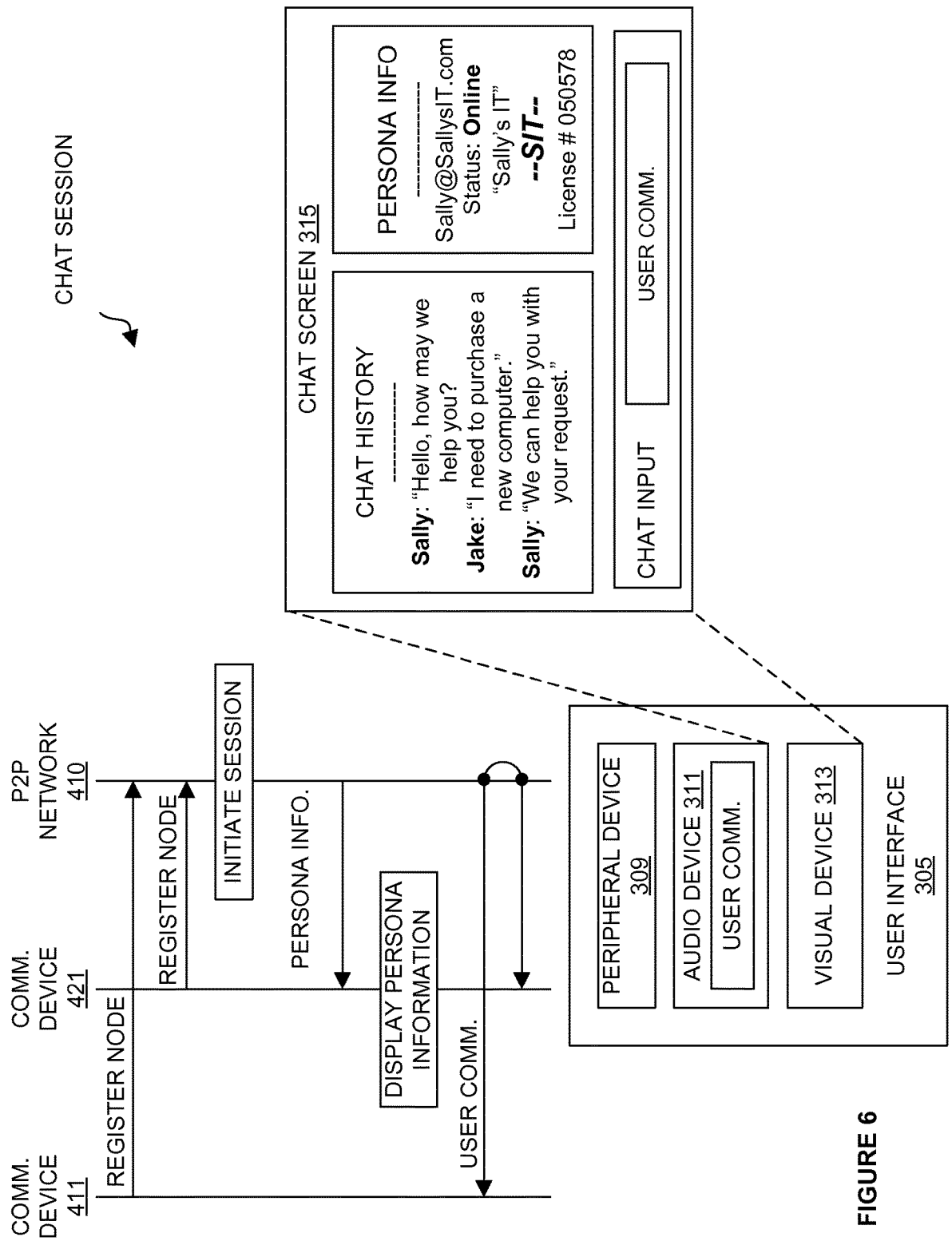
FIG. 6 illustrates a call flow diagram of a chat session and a block diagram of a user interface and a chat screen in an exemplary embodiment.

In providing a specific example of a communication session, FIG. 6 illustrates an exemplary embodiment whereby Jake, a customer or potential customer of Sally, engages in a communication session with Sally. In this example, the communication session is a chat session. In FIG. 6, two diagrams are shown: a session flow diagram and a block diagram. The session flow diagram illustrates the information flow of the session. The block diagram demonstrates a user experience.

Referring to the session flow diagram of FIG. 6, communication device 411 registers as node 413 with P2P network 410 via registration system 409. Likewise, communication device 421 registers as node 423 with P2P network 410 via registration system 409. Once registered, a session is initiated between the two nodes. It should be understood that the session could be initiated in a variety of ways. For instance, Jake could initiate the session by directing node 423 to engage node 413. Likewise, Sally could initiate the session by directing node 413 to engage node 423.

Upon the initiation of the session, persona information for Sally is transferred by persona system 405 for display to Jake by communication device 421. The persona information is selected from persona record 407 by persona system 405. In the meantime, user communications may be exchanged between communication devices 411 and 421 operated by Sally and Jake, respectively.

Referring to the block diagram of FIG. 6, the experience of Jake when operating communication device 421 is shown. Communication device 300 of FIG. 3 is representative of communication device 421. Thus, communication device 421 may include a user interface 305, visual device 313, audio device 311, and peripheral device 309. During the session, visual device 313 displays chat screen 315.

Chat screen 315 displays a variety of information, including a chat history, a chat input box for displaying user communications input by a user, and the persona information selected by persona system 405. The portion of chat screen 315 that displays the persona information includes the communication handle, status, business name, and logo associated with Sally's business persona. In an additional example, a license number associated with Sally's business is displayed. It should be understood that some items included in the persona information could be omitted while other types of persona information could be included.

In an alternative example, it may be determined that Jake is a personal contact of Sally's, rather than a business contact. In such an example, Sally's social persona may be delivered for display to Jake, rather than her business persona. Under these circumstances, the communication handle "sally@p2p.com" would be displayed, rather than Sally's business handle. Other personal information could be delivered and displayed commensurate with the social context of the session. This determination may be made in a variety of ways. For example, persona system 405 may store a list of social contacts that can be queried when sessions are initiated with node 413 or based on prior interactions with Jake.

Figure 7:
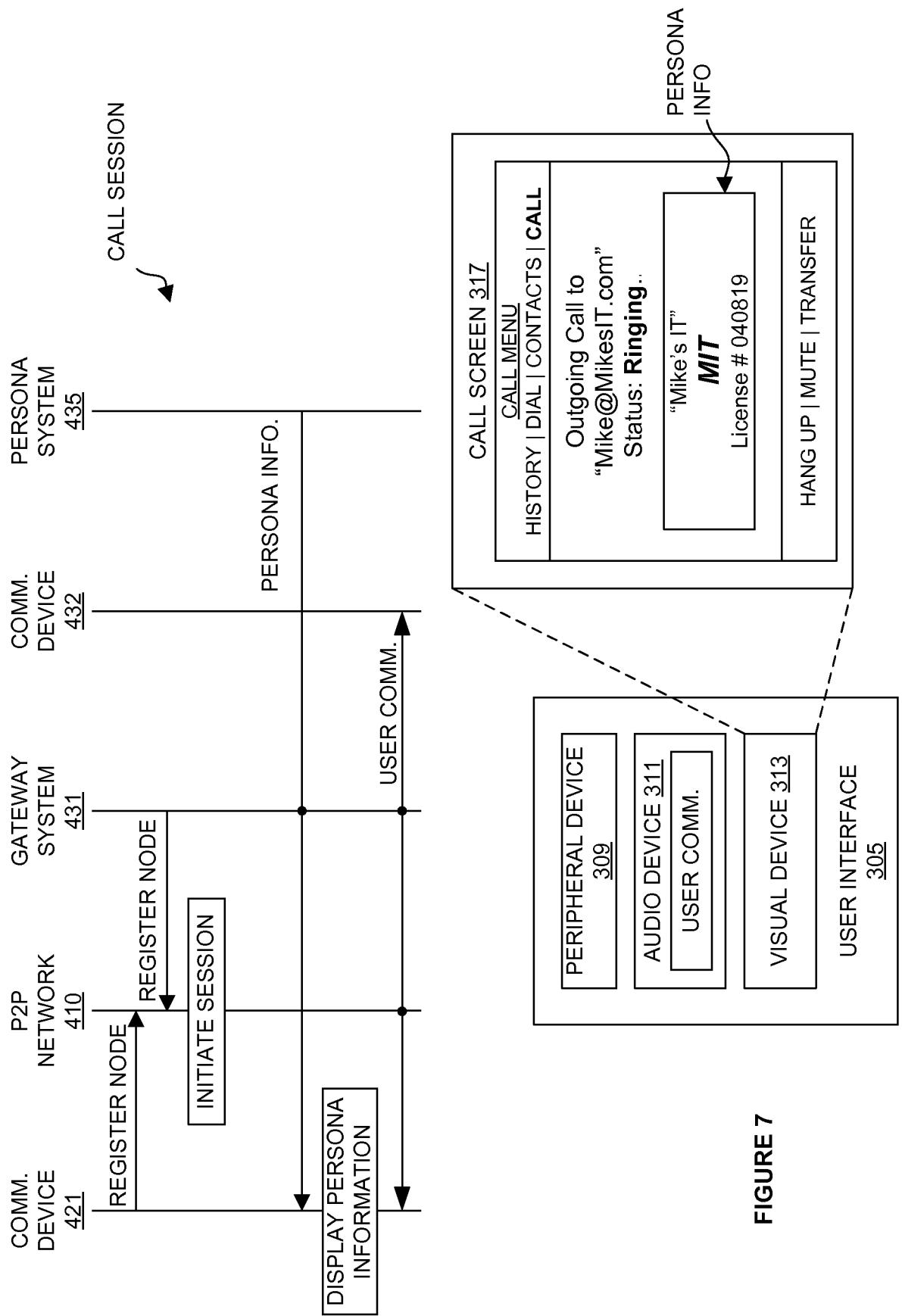
FIG. 7 illustrates a call flow diagram and a block diagram of a user interface and a call screen in an exemplary embodiment.

FIG. 7 illustrates another exemplary embodiment whereby Jake, a customer or potential customer of Mike, engages in a communication session with Mike. In this example, the communication session is a voice call. In FIG. 7, two diagrams are shown: a session flow diagram and a block diagram. The session flow diagram illustrates the information flow of the session. The block diagram demonstrates a user experience.

Referring to the session flow diagram of FIG. 7, communication device 421 registers as node 423 with P2P network 410 via registration system 409. Likewise, gateway system 431 registers as node 433 with P2P network 410 via registration system 409. Gateway system 431 communicates with communication device 432 to facilitate a session between communication device 432 and communication device 421. Once registered, a session is initiated between the devices, including a P2P session established between the two nodes 423 and 433. It should be understood that the session could be initiated in a variety of ways. For instance, Jake could initiate the session by directing node 423 to call Mike via node 433. Likewise, Mike could initiate the session by directing communication device 432, via gateway system 431 and node 433, to call node 423.

Upon the initiation of the session, persona information for Mike is transferred by persona system 435 for delivery to and display by communication device 421 to Jake. It should be understood that the persona information need not be routed through gateway system 431, but rather could be transferred via another path or network. In the meantime, user communications may be exchanged between communication devices 432 and 421 operated by Mike and Jake, respectively.

Referring to the block diagram of FIG. 7, the experience of Jake when operating communication device 421 is shown. As mentioned above, communication device 300 of FIG. 3 is representative of communication device 421. Thus, communication device 421 may include a user interface 305, visual device 313, audio device 311, and peripheral device 309. During the session, visual device 313 displays call screen 317.

Call screen 317 displays a variety of information, such as a call menu having call history, dialing, contacts, and call options. Other options are available within the call menu, including hang up, mute, and transfer options. In this instance, the call option is shown in bold to indicate that it has been selected. When selected, the call option displays that an outgoing call has been placed from node 423 to a destination. The call screen indicates that the call to Mike is ringing. In addition, the call screen displays the persona information for Mike delivered for display to Jake. The persona information includes the communication handle, status, business name, and logo associated with Mike's business persona. In an additional example, a license number associated with Mike's business is displayed. It should be understood that some items included in the persona information could be omitted, while other types of persona information could be included. In some implementations, the persona information delivered to Jake may be updated at least once during the call or session.

Before or during the communication session between Jake and either Sally (as shown in FIG. 6) or Mike (as depicted in FIG. 7), profile information descriptive of, or otherwise associated with, Jake may be gathered or aggregated, such as by way of aggregating system 450, and transferred to another participant of the communication session, such as Sally or Mark.

Figure 8:
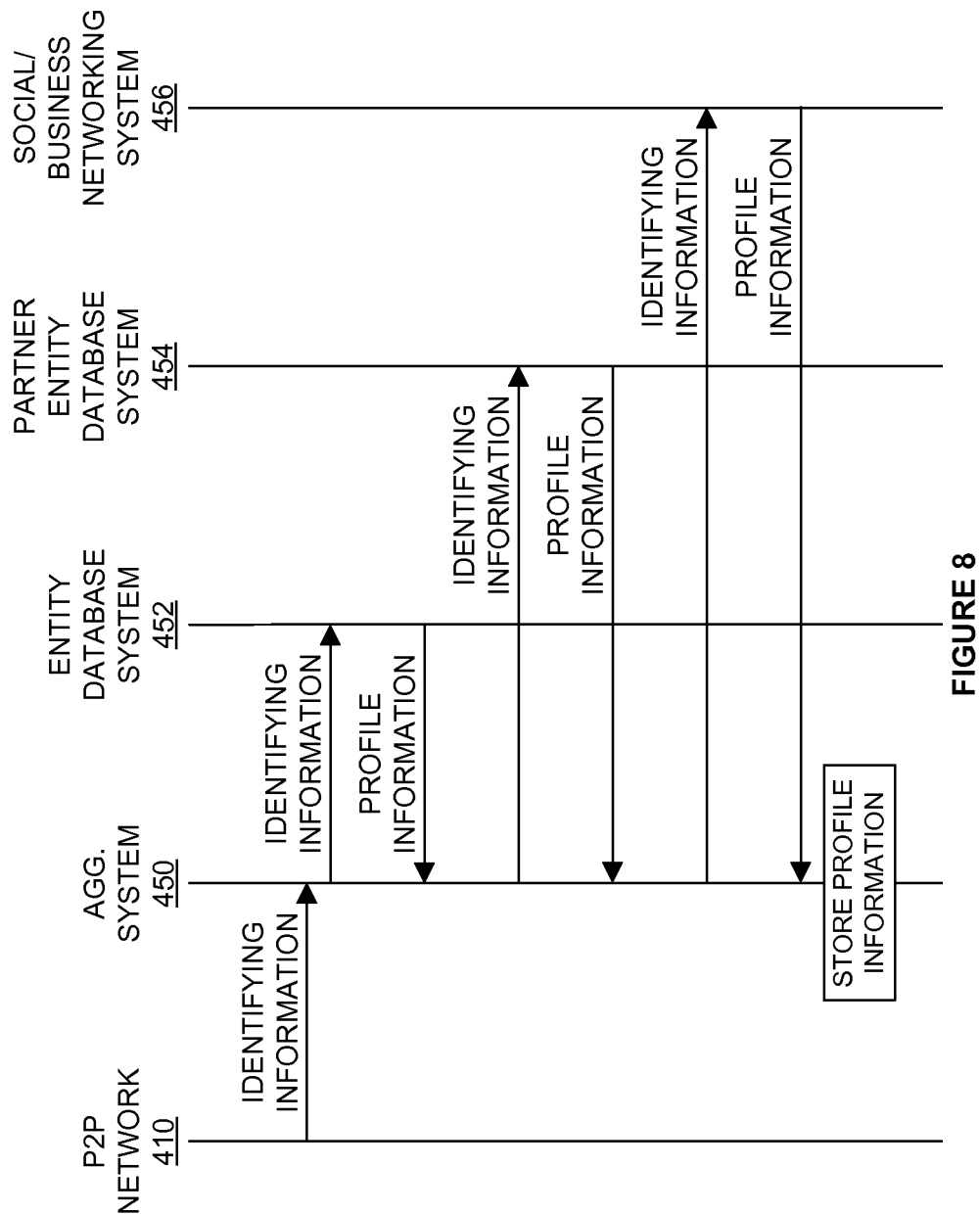
FIG. 8 illustrates a flow diagram depicting aggregation of profile information associated with a call participant.

As displayed in the flow diagram of FIG. 8, identifying information associated with a communication session participant is received by the aggregating system 450. In this specific example, the identifying information is received from the P2P network 410. More specifically, the identifying information may be an identifier, such as an identifier employed to identify the associated participant on the P2P network 410, such as "jake1234" (for example, a Skype ID). Other identifiers or handles, such as e-mail addresses, phone numbers, and the like, may be employed in other embodiments as the identifying information.

Upon reception at the aggregating system 450, the identifying information is utilized to retrieve profile information descriptive of the participant associated with the identifying information. In the specific example of FIG. 8, the aggregating system 450 sends the identifying information to each of the entity database system 452, the partner entity database system 454, and the social/business networking system 456. However, in other implementations, less than all of these systems 452, 454, and 456 may provide the profile information. Further, other systems not shown in FIG. 8 may possess, and thus provide, the profile information associated with the participant. Additionally, the aggregating system 450, as well as any of the other systems 452, 454, and 456, may be combined with each other, or with other systems, as a single physical computer system. In one example, the aggregating system 450 is associated with, or operated by or on behalf of, the entity associated with one of the participants or a third party.

In one implementation, the identifying information sent to the entity database system 452, the partner entity database system 454, and/or the social/business networking system 456 may not be the same data, or be in the same format, as the identifying information received at the aggregating system 450. For example, in the case that the identification information received at the aggregating system 450 is an identifier associated with the P2P network 410, the aggregating system 450 may generate and transmit other identifying information associated with the participant, such as a name, address, e-mail address, phone number, or other data specifically corresponding to the participant. Further, the generation of one type of identifying information from another may be performed wholly within the aggregating system 450, or may involve other information systems shown in FIG. 8 or other systems not discussed herein. For example, the communication device 421 and/or node 423 associated with the identified communication session participant (Jake) may hold at least a portion of the desired profile information. Such profile information may include, for example, a type, model number, or other description of the communication device 421, such as a desktop computer, laptop computer, or mobile communication device.

In another embodiment, the profile information received from the communication device 421 may include an identity of a website or webpage which the identified participant is viewing at the time of, or prior to, the communication session, such as a webpage associated with an entity corresponding to the other session participant, such as Sally or Mike. In one example, such information may be retrieved by way of web "cookies", web logs, web browser history, or other data resident on the communication device 421 of the identified participant. Other websites not associated with the entity, such as social networking or business networking websites, may be discovered in a similar manner.

As indicated above, the entity database system 452 corresponding to the other session participant may also serve as a source of profile information. For example, the entity database system 452 may be capable of supplying a customer profile associated with the identified participant (i.e., Jake). The customer profile may include any information associated with the relation of the participant to the entity, such as demographic information pertaining to the participant, a customer number, product and service preferences, previous product and service purchases, customer survey answers, or other information regarding previous interaction between the identified participant and the entity.

The aggregating system 450 may receive or retrieve similar information associated with another entity, such as a business partner entity, by way of the entity partner database system 454. An entity partner may be a subsidiary, parent company, or other entity associated with the primary entity, or may be a separate entity with which the primary entity has an information-sharing agreement. In one implementation, such profile information may be transferred between entities via electronic data interchange (EDI).

Another potential source of profile information may be a database or other computer system associated with a business networking website (such as, for example, LinkedIn) or a social network website (e.g., Facebook, Twitter, or Yammer). One possible instance of profile information garnered from such sources may be postings of the participant concerning the entity or competing entities associated with a communication session participant. To retrieve such information, the aggregating system 450 may search messages and/or user profiles associated with a user name or identifier that matches or correlates well with the identifying information received or generated by the aggregating system 450. In other cases, search terms that include the name of the entity, or products or services thereof, may be employed to retrieve messages associated with a number of potential participants, with those messages being further related to a particular user name or identifier.

Other sources of information, such as product or service review websites and other informational sources accessible via the Internet or other electronic means, may be employed in other implementations in addition to, or in lieu of, the examples described above.

The gathering of the profile information by the aggregating system 450 may be performed at any time relative to the initiation of the communication session of interest. For example, the aggregating system 450 may initiate the gathering of profile information, as illustrate in FIG. 8, in response to the initiation of the session. In another example, the aggregating system 450 may initiate the information gathering some time after a previous call with the same participant (i.e., Jake) is initiated or completed. Under other scenarios, the aggregating system 450 may periodically retrieve or search for such information without regard to the current or previous communication sessions involving the identified participant. As a result, the retrieval of profile information may not be restricted to previous or current customers or clients of the entity, but instead may also involve any potential customers or clients.

Figure 9:
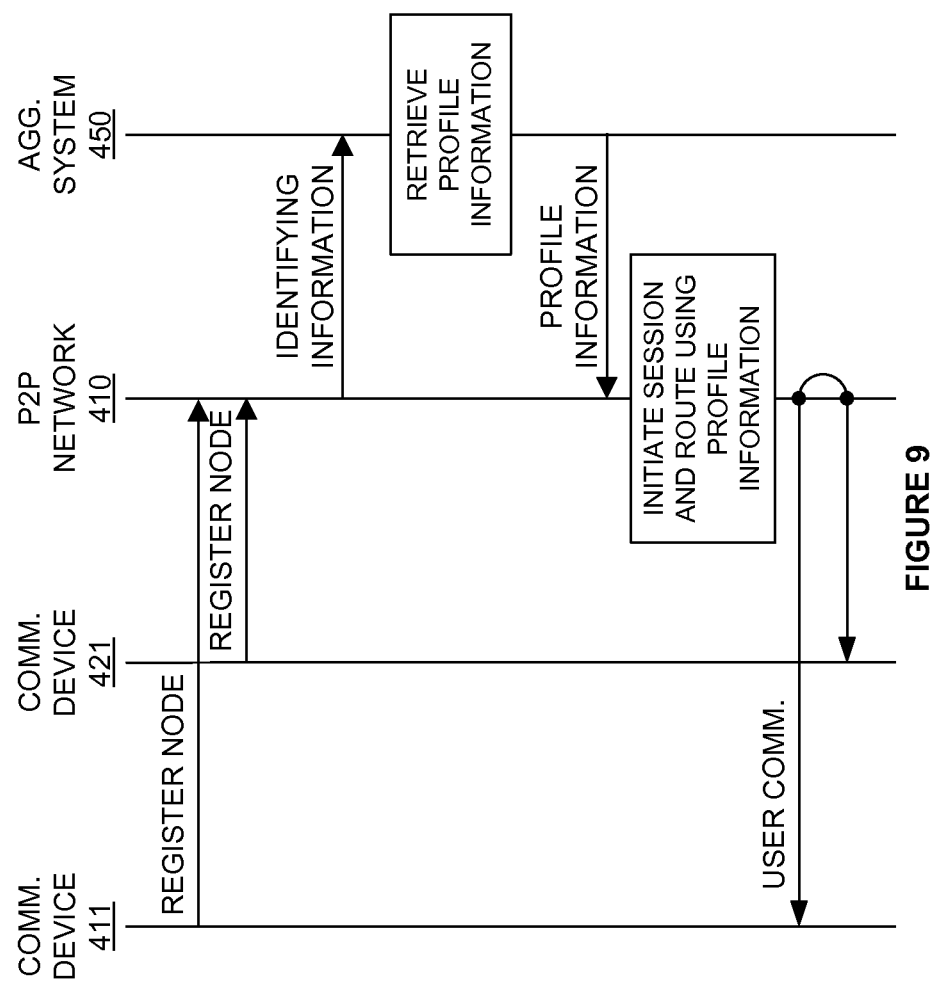
FIG. 9 illustrates a flow diagram depicting call routing based on profile information associated with a call participant.

Once profile information for the communication session participant is collected and stored, the profile information may be employed to conduct, process, or otherwise influence the communication session. As shown in the flow diagram of FIG. 9, the profile information may direct or otherwise influence the routing of the communication session between the participant (i.e., Jake) associated with the identifying information, and a participant (e.g., Mike or Sally) associated with the entity. More specifically, after the communication devices 411, 421, and 431 associated with the possible participants register their corresponding nodes 413, 423, and 433 with the P2P network 410, and the profile information for the identified participant (Jake) is retrieved, the profile information, or some portion thereof, may be transferred to the P2P network 410, the communication network 430, and/or other communication network to route the communication session between the identified participant (Jake) and at least one of the other potential participants associated with the entity. In one example, a decision may be made as to whether the session is to be directed to Mike or Sally based on profile information related to Jake, such as previous product or service interests or needs, previous customer support requests, and the like.

Further, in addition to determining the particular entity participant, the profile information can aid in determining how the session should be routed between the two participants. For example, the type or nature of the communication device 421 associated with the identified participant may determine the communication connection to be employed during the session.

Figure 10:
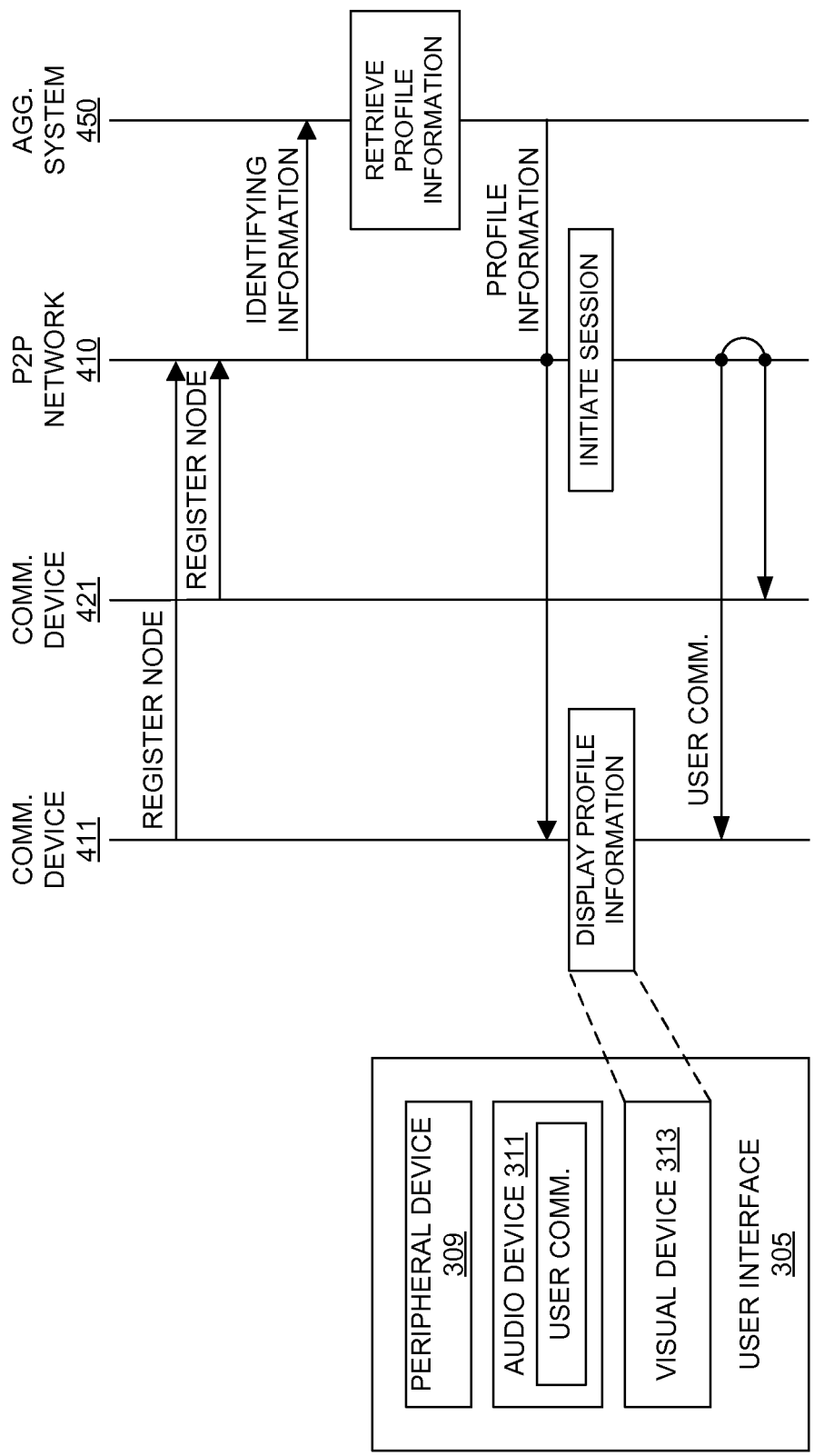
FIG. 10 illustrates a flow diagram and a block diagram associated with displaying to an agent the profile information associated with a call participant.

In another instance, at least some of the profile information may be provided to the entity participant (e.g., Sally) in order to aid that participant in the processing of the session. In one example depicted in FIG. 10, after the communication devices 411 and 421 of the session participants are registered with the P2P network 410, and the profile information associate with the identified participant (Jake) has been retrieved at the aggregating system 450, the aggregating system 450 may forward at least some portion of the profile information to the entity participant (Sally) for presentation on a "dashboard" display on the visual device 313 of the user interface 305 provided by the communication device 411 of the entity participant. Information involving the purchase and customer support history of the identified participant, the current webpage being viewed by the identified participant, the opinions of the identified participant that have been posted publicly regarding the entity, and other information, may aid the entity participant in determining how the questions or concerns of the identified participant should be addressed.

In another implementation, persona information, as described above in conjunction with FIGS. 6 and 7, presented on behalf of the participant associated with the entity may be determined at least in part via the profile information. In one specific example, purchase history, social networking postings, or other forms of profile information may indicate a potential interest in a particular product or service. As a result, persona information may be presented to the identified participant that includes advertisements for that particular product or service.

In yet other scenarios, the profile information gathered at the aggregating system 450 may be employed for other tasks as well, such as determining overall customer satisfaction regarding the products or services offered by the entity.

Advantageously, communication system 400 and its operation provide for the collection or aggregation of profile or context information associated with a participant of a communication session over a P2P network. This profile information may then be employed to route the communication session to another appropriate participant, to present information to the other participant to process the session, and to determine the type of persona information associated with the other session participant to be presented to the identified participant. Other potential benefits to any or all session participants may also result. While the majority of the embodiments discussed above involve a business or other type of entity or organization associated with one of the participants, other examples of the invention may not involve such an entity. Further, while the above examples discuss the possible transfer of persona information to the session participant corresponding to the profile information, such persona information may not be provided or transferred in other implementations.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method, comprising:
   receiving identification information identifying a second session participant operating a second node on a peer-to-peer network;
   gathering profile information descriptive of the second session participant using the identification information, wherein the profile information includes demographic information of the second session participant;
   employing the profile information descriptive of the second session participant to select a first session participant operating a first node of a plurality of nodes on the peer-to-peer network from among at least two potential participants associated with an entity and to determine a communication connection to be employed during a communication session between the first node and the second node; and
   initiating the communication session.

2. The method of claim 1, wherein:
   wherein the identification information comprises an identifier employed to register the second session participant with the peer-to-peer network.

3. The method of claim 1, wherein:
   wherein the profile information comprises information describing previous interaction of the second session participant with an entity associated with the first session participant.

4. The method of claim 1, wherein:
   gathering the profile information comprises retrieving at least a portion of the profile information from a customer database maintained for a first entity associated with the first session participant.

5. The method of claim 1, wherein:
   gathering the profile information comprises retrieving at least a portion of the profile information from a customer database maintained for a partnering entity of a first entity associated with the first session participant.

6. The method of claim 1, wherein:
   gathering the profile information comprises determining if the second session participant is accessing a webpage presented on behalf of a first entity associated with the first session participant, and if so, determining the identity of the webpage.

7. The method of claim 1, wherein:
   gathering the profile information comprises determining a type of device associated with the second node.

8. The method of claim 1, wherein:
   gathering the profile information comprises determining whether the second session participant is logged into a networking website, and if so, determining the identity of the networking website.

9. The method of claim 1, wherein:
   gathering the profile information comprises retrieving a posting by the second session participant to a networking website.

10. The method of claim 1, further comprising:
    providing at least a portion of the profile information for display via the first node to the first session participant.

11. The method of claim 1, further comprising:
    presenting a business persona indicative of a first entity associated with the first session participant to the second session participant via the second node, wherein the business persona is based at least in part on the profile information.

12. The method of claim 1, wherein:
    gathering the profile information occurs prior to an initiation of the communication session over the peer-to-peer network between the first node and the second node.

13. A communication device, comprising:
    a communication interface configured to receive identification information identifying second session participant operating a second node on a peer-to-peer network;
    a processing system configured to gather profile information descriptive of the second session participant via the communication interface using the identification information, wherein the profile information includes demographic information of the second session participant; and
    a data storage system configured to store the profile information for subsequent transmission via the communication interface, wherein the profile information is to be employed to select a first session participant operating a first node of a plurality of nodes on the peer-to-peer network from among at least two potential participants associated with an entity and to determine a communication connection to be employed during a communication session between the first node and the second node.

14. The communication device of claim 1, further comprising:
    a user interface configured to present at least a portion of the profile information via the first node to the first session participant.

15. A non-transitory computer-readable storage medium having encoded thereon instructions executable on a processing system for employing a method comprising:
    receiving identification information identifying a second session participant operating a second node on a peer-to-peer network;
    gathering profile information descriptive of the second session participant using the identification information, wherein the profile information includes demographic information of the second session participant; and
    employing the profile information descriptive of the second session participant to select a first session participant operating a first node of a plurality of nodes on the peer-to-peer network from among at least two potential participants associated with an entity and to determine a communication connection to be employed during a communication session between the first node and the second node; and
    initiating the communication session.

16. The non-transitory computer-readable storage medium of claim 15, wherein the method further comprises:
    providing at least a portion of the profile information for display via the first node to the first session participant.

* * * * *

UNITED STATES PATENT AND TRADEMARK OFFICE
CERTIFICATE OF CORRECTION

PATENT NO. : 10,681,121 B2
APPLICATION NO. : 13/381270
DATED : June 9, 2020
INVENTOR(S) : Alan Edward Baratz et al.

It is certified that error appears in the above-identified patent and that said Letters Patent is hereby corrected as shown below:

In the Claims

Column 14, Claim 14, Line 33, delete "1," and insert --13,--

Signed and Sealed this
Eighth Day of September, 2020

Andrei Iancu
*Director of the United States Patent and Trademark Office*